(12) United States Patent
Novick et al.

(10) Patent No.: US 8,689,048 B1
(45) Date of Patent: Apr. 1, 2014

(54) NON-LOGGING RESUMABLE DISTRIBUTED CLUSTER

(75) Inventors: Ivan D. Novick, Sunnyvale, CA (US); Timothy Heath, Belmont, CA (US)

(73) Assignee: EMC Corporation, Hopkinton, MA (US)

(*) Notice: Subject to any disclaimer, the term of this patent is extended or adjusted under 35 U.S.C. 154(b) by 267 days.

(21) Appl. No.: 13/240,869

(22) Filed: Sep. 22, 2011

(51) Int. Cl.
*G06F 11/00* (2006.01)

(52) U.S. Cl.
USPC .......................................................... 714/15

(58) Field of Classification Search
USPC ................... 714/2, 15, 16, 38.1; 717/168, 171
See application file for complete search history.

(56) References Cited

U.S. PATENT DOCUMENTS

| 5,922,078 A * | 7/1999 | Hirayama et al. ............... 714/16 |
| 7,174,479 B2 * | 2/2007 | Kutan et al. ..................... 714/15 |
| 7,979,870 B1 * | 7/2011 | Pulsipher ....................... 719/330 |
| 2002/0138321 A1 * | 9/2002 | Yuan et al. ........................ 705/8 |
| 2007/0294697 A1 * | 12/2007 | Theimer et al. ............... 718/102 |
| 2010/0333094 A1 * | 12/2010 | Restall et al. ................. 718/102 |

FOREIGN PATENT DOCUMENTS

WO  WO 2010019356 A2 *  2/2010  .............. G07F 17/32

* cited by examiner

*Primary Examiner* — Scott Baderman
*Assistant Examiner* — Joseph Kudirka
(74) *Attorney, Agent, or Firm* — Barry N. Young

(57) ABSTRACT

A distributed reusable framework comprising a non-logging resumable workflow of actions that runs independently in parallel to upgrade each machine of a large distributed cluster of machines. A CHECK process and a RUN process are associated with each action in the workflow. The CHECK process determines dynamically the state of each action, and the RUN process brings an action to a completed state. Following a reboot on a machine, the workflow on the machine sequences back to its start and rechecks each prior action of the workflow to verify that each action is in a completed state before. Upon a failure of the upgrade on a single machine in the cluster, the failed machine can be fixed and the workflow can be resumed without redoing the work already done. Since the actual live state is verified on each machine of the cluster, log files are unnecessary.

19 Claims, 3 Drawing Sheets

NON-LOGGING RESUMABLE DISTRIBUTED CLUSTER

BACKGROUND

This invention relates generally to management of a distributed cluster of computers, and more particularly to processes for efficiently updating the computers in a distributed cluster of machines in a large distributed processing system.

Computers are typically required to be upgraded (updated) on a regular basis for a variety of different reasons. Upgrades may be for the purpose of improving performance, correcting software bugs and security problems, adding new functions and capabilities, and up grading system components, to name a few. The updates may include, for example, new application software, new operating system software, new hardware drivers, hardware configuration changes, firmware updates, system configuration file changes or any other file system changes on the machine.

Generally, upgrading the software on a computer is a lengthy time-consuming process which is rendered more difficult because of the large number of different types of updates which typically must be preformed. In a distributed processing system comprising a distributed cluster of computers, the processing workload is shared among the computers of the cluster, and it is necessary that these computers of the cluster be updated together in parallel so that they are compatible with one another, and so that they have the same or equivalent functionality and processing capabilities. Since the machines that need to be updated have user data on them, a complete re-imagining of a machine is not possible because user data must be preserved. When dealing with a large cluster of machines, the upgrade process may be slower on some machines than on others. Thus, while the upgrade process should be done at the same time on all machines, the upgrade of each machine is preferably done independently, and, for performance reasons, without any communication to a controlling master server.

Furthermore, since multiple reboots of a machine may be necessary during upgrade, the machine should continue to update itself automatically through the reboots, as required. Also, the update of some machines of a large cluster may fail partway through the upgrade process due, for instance, to faults or to unexpected inconsistencies introduced into specific machines. When a failure occurs, it is desirable to be able to resume the upgrade process on the failed machine without the necessity of redoing actions that have already been successfully completed. In order to be reliable and scalable, the upgrade process must be able to track successfully completed actions. However, it cannot rely upon centralized technologies, such as NFS, which would introduce a single point of failure into the upgrade process and adversely impact the ability of the process to scale. One, well known way to track actions which have been completed and uncompleted on the various machines of a cluster is to use a log file to record actions. However, a log file is inefficient to maintain, error-prone, and intolerant of failures such as the log file being lost or the occurrence of unexpected interventions that put the system into an unknown state.

It is desirable to provide new and improved methods for upgrading the machines in a distributed computing cluster that address the foregoing and other known problems of upgrading machines in large clusters, and which are efficient, reliable and scalable. It is to these ends that the present invention is directed.

DESCRIPTION OF PREFERRED EMBODIMENTS

The invention is particularly well adapted for managing upgrades to the computers in a large distributed cluster of computer, and will be described in that context. As will be appreciated, however, this is illustrative of only one utility of the invention.

Figure 1:
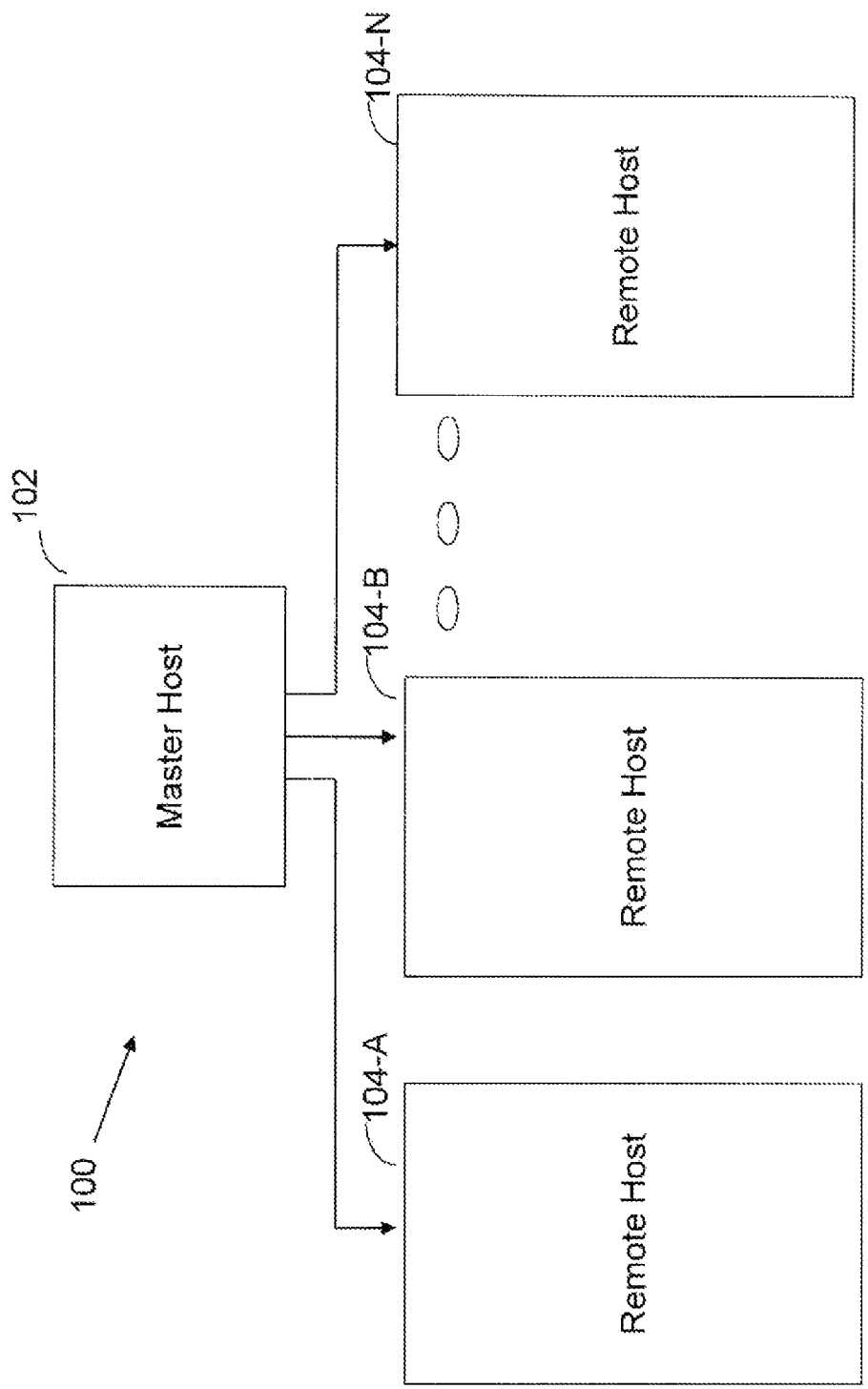
FIG. 1 is a block diagram of a cluster of computers of a distributed computing system of the type with which the invention may be employed.

FIG. 1 illustrates the architecture of a known type of distributed processing system, e.g., a distributed database, comprising a cluster 100 of distributed computers (hosts) with which the invention may be employed. The cluster may include a master host 102 and a plurality of remote hosts 104-A through 104-N connected together by a network. The hosts of the cluster are independent of one another and may perform a plurality of data processing operations in parallel. Each host may be associated with one or more database instances, for instance, and the data processing operations may comprise parallel database operations. The master host 102 may coordinate the operations of the remote hosts 104. As used herein, a "host" is also referred to both as a "computer" and as a "machine".

Figure 2:
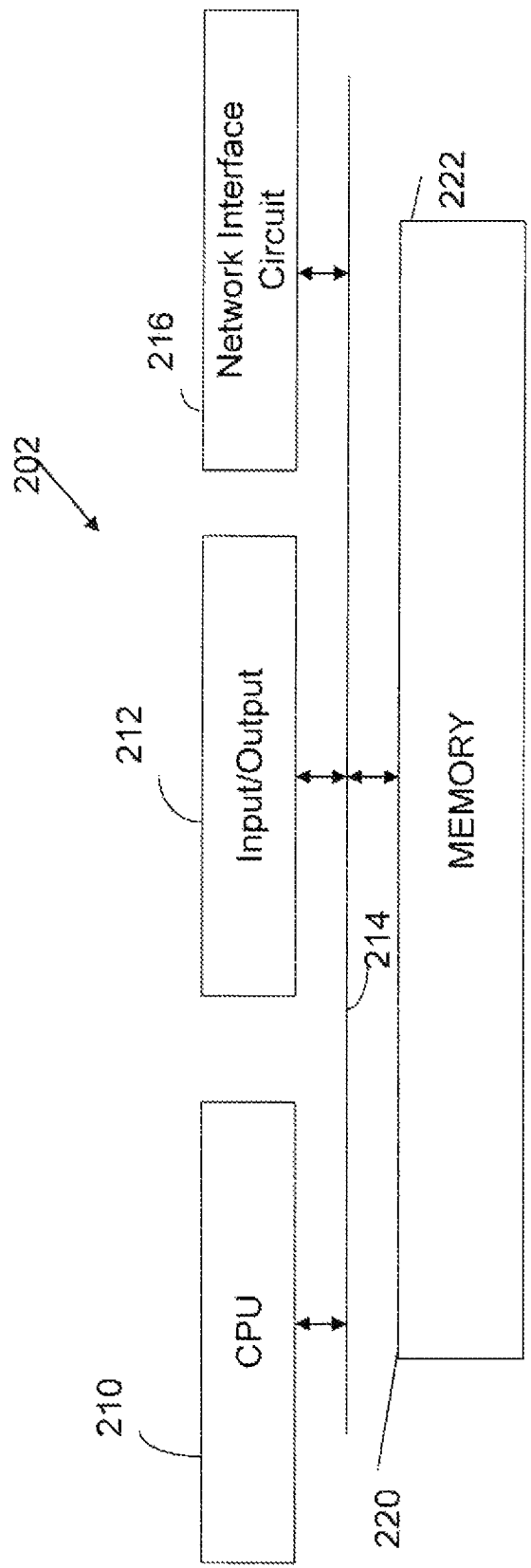
FIG. 2 is a block diagram of a typical computer node of the distributed computer system of FIG. 1.

FIG. 2 illustrates the architecture of a typical host 202 of the cluster 100 that is configured to implement operations in accordance with the invention. The host may comprise a server computer or CPU 210 connected to input/output (I/O) devices 212 by a communications bus 214. The I/O devices may comprise storage disks as well as other standard computer system input and output devices. A network interface circuit 216 may also be connected to bus 214 to allow the host to operate in a networked environment. The host may also have memory 220 connected to the bus that comprises a computer readable storage medium for storing executable instructions to control the operation of the host computer to perform processes in accordance with the invention. The master and remote hosts may all have substantially similar architectures, although they may comprise different types of hardware and software components, such as computers that run different operating system and application software.

As described above, software upgrades to computers must be performed on a regular basis, which is a demanding process on a large cluster of machines, especially where there may be numerous different types of upgrades that need to be made. Upgrades comprise a sequence of steps or actions that must be performed on a machine. As will be described, the invention provides a workflow framework comprising a sequence of actions corresponding to the sequence of steps of an upgrade process that facilitates the upgrade by controlling the sequence of steps of the upgrade. The workflow monitors the state of each action on the machine, and verifying that each action of the upgrade process successfully completes.

The workflow framework in accordance with the invention may run on each machine (host) of the cluster. The workflow framework comprises a reusable generalized set of actions that may be readily adapted to the steps of a plurality of different types of upgrade processes without the necessity of having to consider machine infrastructure or to re-create the upgrade framework each time an update is to be made. The inventive workflow framework is also efficient and reliable. It does not depend upon log files to maintain lists of completed and uncompleted steps, but rather verifies dynamically the actual state of the machine undergoing upgrading at different points of the upgrade process to ensure that the overall upgrade is successfully completed. For example, if an action changes the ownership of a file to read-only, and a subsequent action changes ownership of the file again to be writable, this needs to be detected. A log file that simply listed completed actions were used would indicate incorrectly that the first action was completed successfully, since it would not show the result of the interaction between the multiple stages of the upgrade.

The workflow framework of the invention is also distributed so that each machine upgrades itself autonomously, and is resumable from a point of an upgrade failure without the necessity of redoing successfully completed upgrade work. If, for example, the upgrade of a single machine in a cluster fails after a six hour upgrade because a file had been accidently deleted, upon the deleted file being restored, the workflow and the upgrade can be resumed without having to redo successfully completed actions and without the inherent risks in repeating the upgrade on all machines. Moreover, since the workflow runs on each machine autonomously, it does not rely upon control from or communications with a central machine. This reduces network traffic and affords more fault tolerance.

Referring to FIG. 1, the workflow framework runs on the master host 102 as well to as on each remote host 104. While the master host does not control the workflow process, it may coordinate it. The master host may, for example, copy the upgrade package with all required software and configuration files to the remote hosts on the cluster, initialize each host with the workflow code, and initiate the workflow framework on the hosts. Hosts may be of different types and have different workflow codes. For example, a Linux host may require one workflow code, while a Solaris host may require a different workflow code.

The master host may also run a "PRE-REQUISITE" process, which will be described below, on each remote host for each action in the workflow prior to starting the upgrade to determine whether there is anything on a host that will prevent an action from running successfully. If the PRE-REQUISITE process fails on any action, then the master host will not start the workflow process. If the PRE-REQUISITE process succeeds, the master host can initialize the workflow framework to begin running on each remote machine in the cluster. System startup services (such as /etc/init.d on Linux) may be used to have the upgrade start (or resume) itself as soon as the machine reboots until the upgrade service "de-registers" itself from the system startup services indicating it has no more work to perform.

The master may periodically poll each remote machine to determine dynamically the state of the upgrade on the machines until all remote machines either indicate that the upgrade completed successfully or report an error. If no remote machine indicates an error, the master host may then start the upgrade process on itself. The master host as well as a remote host may reboot as part of the workflow. Reboot will be indicated in the state files of the hosts when it is completed. A user may log into the master host at any time to view the status of the upgrade process. If all machines, remote and master, indicate no error, then a "VERIFY" process (which will be described) may be run for each action in the workflow on each machine to confirm that the states of all machines are as expected before issuing an indication of a successful upgrade.

As previously described, a software (or firmware) upgrade process generally comprises a sequence of actions or steps that must be completed successfully on a machine for the upgrade to be successful. Workflow actions correspond to the steps that a software program needs to perform to install its code and run. Actions may comprise, for example, installing new files or deleting or changing permissions of existing files, updating configuration files, etc. Some actions of the upgrade may require that the machine be rebooted for the action to be accomplished. The invention provides a generalized workflow framework for managing the sequence of actions that an upgrade needs to perform. The workflow associates with each action certain predetermined processes, of which there may be four. These processes may include, for example, PRE-REQUISITE, CHECK, RUN and VERIFY processes, as will be described.

The PRE-REQUISITE process checks to see if it is possible to implement each of the particular actions on each machine of the cluster. It is preferably called before any actions are executed to change the state of any machine in the cluster. If any PRE-REQUISITE process fails on any action or machine, the upgrade may not begin until the cause of the failure is corrected. An example may be, for instance, to update a network driver where there may be a set of four different known supported versions 1, 2, 3, and 4 of the driver. If the PRE-REQUISITE process determines that an unsupported version of the driver is currently installed, e.g., version 5, the PRE-REQUISITE process fails and the upgrade will not be started because it could result in an unsupported situation.

The CHECK process will run a set of system commands on a machine in order to determine dynamically the state of each action. There are three possible outcomes of the CHECK process, i.e., DONE, NOT-DONE, and UNEXPECTED. DONE indicates that an action has been successfully completed; NOT-DONE indicates that the action has not been completed; and UNEXPECTED means that the system is in a state in which the action cannot be performed. The workflow framework uses these states to dynamically determine the actual current state of an action, rather than using a log. For example, when installing a new Linux kernel, an rpm command is generally run to determine whether the expected package is currently installed on the system. If the expected version of the package is installed, the state DONE is returned; if a different version is installed, the state NOT-DONE is returned, rather than UNEXPECTED. An example of where the state UNEXPECTED would be returned is where there is an action to decrease the security permissions on a critical system file. If a critical system file is not found on the system, the action is in an UNEXPECTED state since it cannot be performed.

The RUN process provides the system commands required to execute the upgrade code necessary to bring a workflow action from a NOT-DONE state to a DONE state, e.g., delete file XYZ. If, for instance, the action is to bring the kernel into the Federal government secure mode, there are a series of logic steps that RUN will invoke to accomplish the action, such as to reinitialize the kernel with the new options, as by running a mkinitrd command and replacing the GRUB boot configuration file.

The VERIFY process checks to determine whether actions have completed successfully. This process may be called after all actions on all machines of the cluster are finished for the entire upgrade. If the VERIFY process fails on any machine for any action, the upgrade itself will fail and require manual intervention to correct the problems before the upgrade can be restarted. The VERIFY process may embody more system checks than the CHECK process, since it can perform more validations of an action after subsequent actions are completed in the workflow. For instance when upgrading the Linux kernel version by installing new kernel rpm files, the CHECK process will return DONE as soon as the rpm packages are installed. However a "uname-a" command may not show the new kernel until after a further action is taken to reboot the machine. In this case the VERIFY process will run system commands to determine the expected value of uname-a and also to confirm the installation of the package. If both the package installation and the uname-a command do not return the expected values after the upgrade, the VERIFY process will fail.

Figure 3:
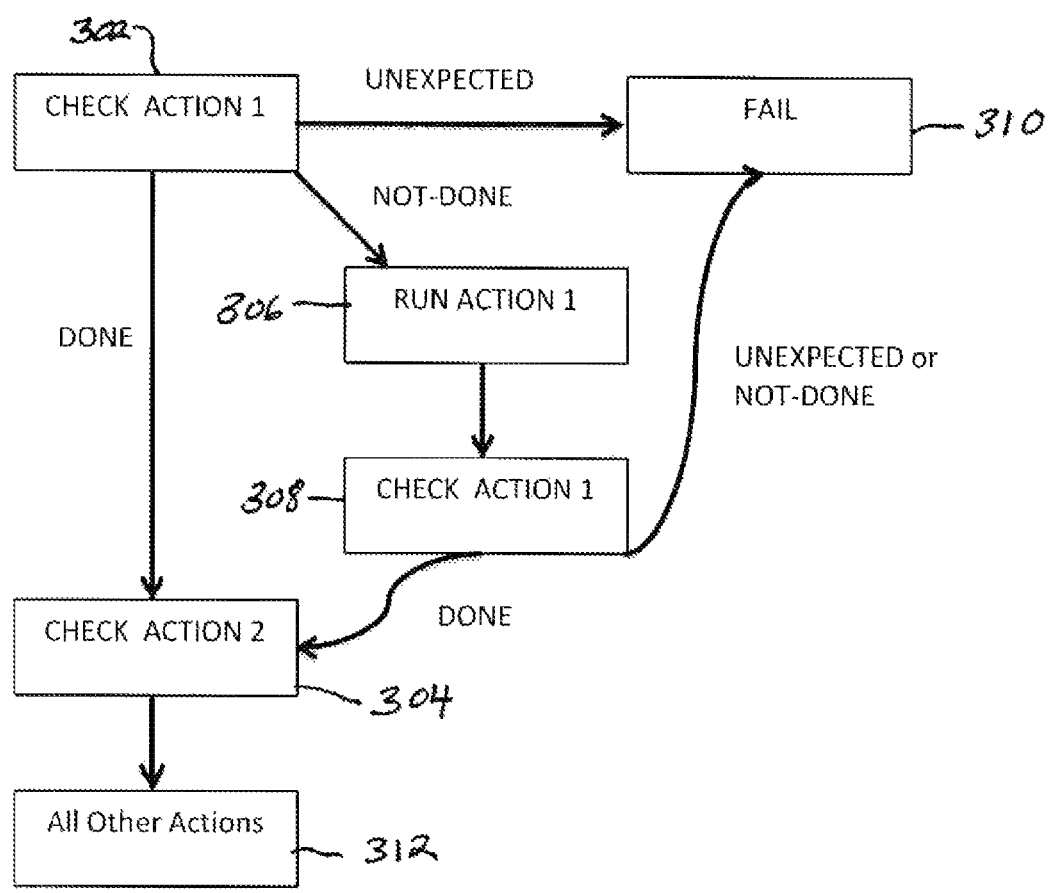
FIG. 3 is a schematic diagram of a workflow process in accordance with the invention that may be used for upgrading the computers of the system of FIG. 1.

FIG. 3 illustrates the execution of a workflow framework in accordance with the invention on a single machine. The workflow framework, as previously described, comprises a sequence of actions corresponding to a sequence of actions of an upgrades process. It manages and controls the execution of the sequence of actions that the upgrade software which was loaded onto the machine by the master must perform in order to install itself and run. The workflow framework begins with the first action, Action 1, of the upgrade code, and then proceeds sequentially through the remaining actions until it reaches the last one.

Referring to FIG. 3, after the first Action 1 of the upgrade process has been performed, the workflow framework performs a CHECK process, as described above, on Action 1 at 302 to determine the state of the action. If the CHECK process on Action1 at 302 returns a state DONE, the workflow proceeds directly to step 304 where it performs a CHECK process on the next action, Action 2. If instead, the CHECK process at 302 returns a state NOT-DONE, the workflow proceeds to step 306 where it performs a RUN process to cause the machine to execute the upgrade code for Action 1. When execution of the upgrade code corresponding to Action 1 is completed on the machine as a result of the RUN process at step 306, the workflow then proceeds to step 308 where it repeats the CHECK process on Action 1. If the resulting state of this CHECK process at step 308 is DONE, the workflow proceeds to step 304 and performs a CHECK process on the second action, Action 2. If, however, the CHECK process at step 308 returns a state of UNEXPECTED or NOT-DONE, the workflow proceeds to step 310 where it indicates that the upgrade has failed. The reason that a NOT-DONE state at step 308 results in a failure indication at step 310 is that after causing the machine to execute the upgrade code for Action 1 at step 306 Action 1 has not successfully completed, there is a problem with the upgrade on that particular machine which will require manual intervention to correct. Similarly, if the result of the CHECK Action 1 process at step 302 returns an UNEXPECTED state, will the workflow will also proceed to step 310 to indicate a failure requiring manual intervention.

At step 304, a similar set of steps as described above for Action 1 may be performed for Action 2. If the result of the CHECK Action 2 process at 304 is either a NOT-DONE or an UNEXPECTED state, the workflow may proceed from step 304 to a set of steps that are the same as steps 306, 308 and 310, as appropriate. Otherwise, if the CHECK Action 2 process at 304 returns a DONE state, the workflow proceeds to step 312 where it will proceed to perform this same set of steps on each of the other actions in sequence to check for their successful completions. Upon the completion of the last action of the upgrade process, the workflow may invoke the VERIFY process to verify successful completion of the upgrade.

After the master workflow process on the master host starts the workflow on the remote hosts, the workflows run autonomously and independently on each machine, and no further communication between the master and the other machines is required. The master host may periodically poll the remote machines of the cluster to determine their states.

As part of the upgrade process, one or more machine reboots may be required. Upon a machine coming back up from a reboot, the workflow framework of FIG. 3 is restarted on that machine from the beginning Action 1 to recheck that each successive action is completed. Since the CHECK process to check an action requires little machine time and can be performed quickly, the workflow can quickly recheck for successful completion of each action in the sequence down to the point of the reboot, and run the execution code for only any action that was not completed. This advantageously allows the state of the upgrade on the machine to be dynamically rechecked, and the upgrade process to be resumed from the point of reboot without having to redo the upgrade from the beginning.

Since a programming logic error can create a workflow that results in a continuous reboot loop, the workflow may incorporate a "deadman" switch as part of the reboot cycle to prevent a machine from rebooting more than a predetermined number of times before the workflow detects that something is wrong and cancels the upgrade on that host. The deadman switch may be stored as a reboot count on the file system.

If the upgrade is interrupted or fails for any reason, it is not necessary to roll back the work already done or to repeat any steps. The workflow framework of the invention enables the upgrade process to be restarted, and all machines in the cluster to determine their own states and to execute any required actions to complete the upgrade. Since failures and unexpected events are common in a large cluster, the workflow framework of the invention enables all hosts to be brought to a known state, and minimizes the amount of work, elapsed time and manual interventions required for an upgrade.

An embodiment of the invention affords a computer storage product comprising a computer readable non-transitory storage medium storing the workflow framework as executable instructions for controlling the operations of a computer to perform the processing operations described herein. The computer readable medium may be any standard well known storage media, including, but not limited to magnetic media such as hard disks, floppy disks, magnetic tape; optical media such as CD-ROMs, DVDs, holographic devices; magneto-optical media; and hardware devices configured to store and execute program code, such as application-specific integrated circuits (ASICs), programmable logic devices and ROM and RAM devices.

Although the foregoing has been with reference to preferred embodiments of the invention, it will be appreciated by those skilled in the art that changes to these embodiments may be made without departing from the principles and spirit the invention, the scope of which is defined by the appended claims.

The invention claimed is:
1. A method of upgrading a computer in a distributed cluster of computers, comprising:
   executing a workflow comprising a sequence of actions on said computer, said actions corresponding to a sequence of steps in an upgrade of said computer;

following each action, dynamically checking a state of the action to determine whether the action was completed, and, if so, proceeding to a next action in said sequence of actions;

otherwise, upon the state indicating that the checked action is uncompleted, running on the computer an executable program corresponding to said uncompleted action, and rechecking the state of said uncompleted action after said running;

upon said rechecking indicating that said uncompleted action is complete, resuming said executing of said workflow with the next action in said sequence, otherwise indicating a failure of said uncompleted action; and wherein, upon an action in said workflow of actions requiring a reboot of the computer, the computer restarts execution of said workflow from a first action in said sequence of actions and proceeds through the workflow skipping actions that are completed.

2. The method of claim 1, wherein each action has one of a done state indicating that the action is completed, a not-done state indicating that the action is uncompleted, and an unexpected state indicating that the action cannot be completed.

3. The method of claim 1, wherein upon an action failing, resuming the workflow, following correction of a cause of the failure, without redoing previously completed actions.

4. The method of claim 1, wherein said cluster comprises a master computer and a plurality of remote computers connected by a network, and wherein said instructions independently, substantially simultaneously, and in parallel control each of said computers.

5. The method of claim 4, wherein said master computer executes a master process that initiates said workflow on said remote computers, and periodically polls said remote computers to determine the states of their actions.

6. The method of claim 5, wherein the master computer performs a pre-requisite process on the remote computers of the cluster prior to initiating the workflow to detect conditions on said remote computers that cause the workflow to fail.

7. The method of claim 4, wherein, upon the upgrade being interrupted or failing on a computer of the cluster, the remaining computers of the cluster independently determine their states and resume executing the workflow without redoing previously completed actions.

8. The method of claim 4, wherein the master computer performs a verify process on the remote computers of the cluster upon the workflow finishing to verify that the workflow completed successfully on all of the remote computers of the cluster before beginning the workflow on the master computer.

9. Computer readable non-transitory storage medium for storing executable instructions for controlling a computer in a distributed cluster of computers for upgrading the computer, comprising instructions for:

executing a workflow comprising a sequence of actions on said computer, said actions corresponding to a sequence of steps in an upgrade of said computer;

following each action, dynamically checking a state of the action on the computer to determine whether the action was completed, and, if so, proceeding to a next action in said sequence of actions;

otherwise, upon the state indicating that the checked action is uncompleted, running on the computer an executable program corresponding to said uncompleted action, and rechecking the state of said uncompleted action after said running;

upon said rechecking indicating that said uncompleted action is complete, resuming said executing of said workflow with the next action in said sequence, otherwise indicating a failure of said uncompleted action, and further comprising instructions, upon an action in said workflow of actions requiring a reboot of the computer, for controlling the computer to restart execution of said workflow from a first action in said sequence of actions and to proceed through the workflow skipping actions that are completed.

10. Computer readable non-transitory storage medium of claim 9 further comprising instructions, upon an action failing, for resuming the workflow following correction of a cause of the failure without redoing previously completed actions.

11. Computer readable non-transitory storage medium of claim 9, wherein said cluster comprises a master computer and a plurality of remote computers connected by a network, and wherein said instructions independently, substantially simultaneously, and in parallel control each of said computers.

12. Computer readable non-transitory storage medium of claim 11, wherein said instructions control the master computer to execute a master process that initiates said workflow on said remote computers and periodically polls said remote computers to determine the states of their actions.

13. Computer readable non-transitory storage medium of claim 11, wherein said instructions control the master computer to perform a pre-requisite process on the remote computers of the cluster prior to initiating the workflow to detect conditions on said remote computers that cause the workflow to fail.

14. Computer readable non-transitory storage medium of claim 11 further comprising instructions, upon the upgrade being interrupted or failing on a computer of the cluster, for controlling the remaining computers of the cluster to independently determine their states and resume executing the workflow without redoing previously completed actions.

15. Computer readable non-transitory storage medium of claim 11, wherein said instructions control the master computer to perform a verify process on the remote computers of the cluster upon the workflow finishing to verify that the workflow completed successfully on all of the remote computers of the cluster before controlling the master computer to begin the workflow.

16. A method of upgrading a computer in a distributed cluster of computers comprising a master computer and a plurality of remote computers connected by a network, comprising:

executing a workflow comprising a sequence of actions on said computer, said actions corresponding to a sequence of steps in an upgrade of said computer;

following each action, dynamically checking a state of the action to determine whether the action was completed, and, if so, proceeding to a next action in said sequence of actions;

otherwise, upon the state indicating that the checked action is uncompleted, running on the computer an executable program corresponding to said uncompleted action, and rechecking the state of said uncompleted action after said running;

upon said rechecking indicating that said uncompleted action is complete, resuming said executing of said workflow with the next action in said sequence, otherwise indicating a failure of said uncompleted action; and wherein said method is performed independently, substantially simultaneously, and in parallel on each of said remote computers, and upon the upgrade being interrupted or failing on a computer of the cluster, the remaining computers of the cluster independently determine their states and resume executing the workflow without redoing previously completed actions.

17. A method of upgrading a computer in a distributed cluster of computers comprising a master computer and a plurality of remote computers connected by a network, the method comprising:

executing a workflow comprising a sequence of actions on said computer, said actions corresponding to a sequence of steps in an upgrade of said computer;

following each action, dynamically checking a state of the action to determine whether the action was completed, and, if so, proceeding to a next action in said sequence of actions;

otherwise, upon the state indicating that the checked action is uncompleted, running on the computer an executable program corresponding to said uncompleted action, and rechecking the state of said uncompleted action after said running;

upon said rechecking indicating that said uncompleted action is complete, resuming said executing of said workflow with the next action in said sequence, otherwise indicating a failure of said uncompleted action; and wherein said method is performed independently, substantially simultaneously, and in parallel on each of said remote computers, and wherein the master computer performs a verify process on the remote computers of the cluster upon the workflow finishing to verify that the workflow completed successfully on all of the remote computers of the cluster before beginning the workflow on the master computer.

18. Computer readable non-transitory storage medium for storing executable instructions for controlling a computer in a distributed cluster of computers for upgrading the computer, the cluster comprising a master computer and a plurality of remote computers connected by a network, comprising instructions for:

executing a workflow comprising a sequence of actions on said computer, said actions corresponding to a sequence of steps in an upgrade of said computer;

following each action, dynamically checking a state of the action on the computer to determine whether the action was completed, and, if so, proceeding to a next action in said sequence of actions;

otherwise, upon the state indicating that the checked action is uncompleted, running on the computer an executable program corresponding to said uncompleted action, and rechecking the state of said uncompleted action after said running; and upon said rechecking indicating that said uncompleted action is complete, resuming said executing of said workflow with the next action in said sequence, otherwise indicating a failure of said uncompleted action, and wherein said instructions independently, substantially simultaneously and in parallel control each of said computers and upon the upgrade being interrupted or failing on a computer of the cluster, and control the remaining computers of the cluster to independently determine their states and resume executing the workflow without redoing previously completed actions.

19. Computer readable non-transitory storage medium for storing executable instructions for controlling a computer in a distributed cluster of computers for upgrading the computer, the cluster comprising a master computer and a plurality of remote computers connected by a network, comprising instructions for:

executing a workflow comprising a sequence of actions on said computer, said actions corresponding to a sequence of steps in an upgrade of said computer;

following each action, dynamically checking a state of the action on the computer to determine whether the action was completed, and, if so, proceeding to a next action in said sequence of actions;

otherwise, upon the state indicating that the checked action is uncompleted, running on the computer an executable program corresponding to said uncompleted action, and rechecking the state of said uncompleted action after said running; and upon said rechecking indicating that said uncompleted action is complete, resuming said executing of said workflow with the next action in said sequence, otherwise indicating a failure of said uncompleted action, and wherein said instructions independently, substantially simultaneously and in parallel control each of said computers and upon the upgrade being interrupted or failing on a computer of the cluster, and control the master computer to perform a verify process on the remote computers of the cluster upon the workflow finishing to verify that the workflow completed successfully on all of the remote computers of the cluster before controlling the master computer to begin the workflow.

\* \* \* \* \*